US010040372B2

(12) United States Patent
Wang et al.

(10) Patent No.: US 10,040,372 B2
(45) Date of Patent: Aug. 7, 2018

(54) IDENTIFYING AND LOCALIZING A VEHICLE OCCUPANT BY CORRELATING HAND GESTURE AND SEATBELT MOTION

(71) Applicant: Samsung Electronics Co., Ltd, Suwon-si (KR)

(72) Inventors: Yu Wang, Mountain View, CA (US); Zhiyun Li, Mountain View, CA (US); Pei Zheng, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/051,556

(22) Filed: Feb. 23, 2016

(65) Prior Publication Data

US 2017/0240066 A1  Aug. 24, 2017

(51) Int. Cl.
*B60N 2/00* (2006.01)
(52) U.S. Cl.
CPC .................... *B60N 2/002* (2013.01)
(58) Field of Classification Search
CPC ..................................................... B60N 2/002
See application file for complete search history.

(56) References Cited

U.S. PATENT DOCUMENTS

| 5,474,327 | A | 12/1995 | Schousek |
| 5,890,085 | A | 3/1999 | Corrado et al. |
| 6,026,340 | A | 2/2000 | Corrado et al. |
| 6,474,683 | B1 * | 11/2002 | Breed ..................... B60J 10/00 |
| | | | 280/735 |
| 6,513,833 | B2 * | 2/2003 | Breed ..................... B60J 10/00 |
| | | | 280/735 |
| 6,753,780 | B2 | 6/2004 | Li |
| 6,820,897 | B2 * | 11/2004 | Breed ................. B60R 21/015 |
| | | | 280/735 |
| 8,660,735 | B2 | 2/2014 | Tengler et al. |
| 9,638,537 | B2 * | 5/2017 | Abramson ......... G01C 21/3626 |

(Continued)

FOREIGN PATENT DOCUMENTS

| KR | 1020140059478 A | 5/2014 |
| KR | 1020160006408 A | 1/2016 |
| KR | 1020160008372 A | 1/2016 |

OTHER PUBLICATIONS

"Random Forests", Wikipedia, https://wikipedia.org/wiki/Random_forest, Feb. 12, 2016, 8 pgs.

(Continued)

*Primary Examiner* — Frederick M Brushaber (57) ABSTRACT

A method, system, and vehicle for locating an occupant within the vehicle. The method includes receiving motion data of a seatbelt for a seat in the vehicle and receiving motion data of a wearable device of the occupant. The method also includes comparing the seatbelt motion data with the wearable device motion data from a same period of time and identifying that the occupant is located at the seat in the vehicle based on a result of the comparison. The method may also include associating the occupant with the vehicle based on location information of the vehicle and location information of the wearable device of the occupant. Additionally, the method may include identifying personalization options for the occupant at the seat based on a user profile of the occupant in response to identifying that the occupant is located at the seat.

20 Claims, 6 Drawing Sheets

(56) References Cited

U.S. PATENT DOCUMENTS

| | | | | |
|---|---|---|---|---|
| 9,691,115 B2* | 6/2017 | Abramson | ............ | G06Q 50/265 |
| 2005/0222730 A1 | 10/2005 | Taipale | | |
| 2009/0024273 A1* | 1/2009 | Follmer | ................ | G06Q 10/10 |
| | | | | 701/33.4 |
| 2009/0024419 A1* | 1/2009 | McClellan | ............ | G06Q 40/02 |
| | | | | 705/4 |
| 2009/0085728 A1* | 4/2009 | Catten | ................... | H04K 3/415 |
| | | | | 340/425.5 |
| 2010/0205012 A1* | 8/2010 | McClellan | ............ | G06Q 40/08 |
| | | | | 705/4 |
| 2010/0207751 A1* | 8/2010 | Follmer | ................. | G01C 21/32 |
| | | | | 340/439 |
| 2010/0207787 A1* | 8/2010 | Catten | .............. | G06F 17/30241 |
| | | | | 340/905 |
| 2012/0253552 A1* | 10/2012 | Skelton | ............... | B60K 28/063 |
| | | | | 701/2 |
| 2013/0041521 A1 | 2/2013 | Basir et al. | | |
| 2013/0151111 A1* | 6/2013 | Skelton | ................... | B60R 25/00 |
| | | | | 701/99 |
| 2013/0336094 A1 | 12/2013 | Gruteser et al. | | |
| 2013/0344859 A1* | 12/2013 | Abramson | ........... | G06Q 50/265 |
| | | | | 455/418 |
| 2014/0028542 A1 | 1/2014 | Lovitt et al. | | |
| 2014/0133672 A1* | 5/2014 | Lakkundi | ................ | H04R 3/12 |
| | | | | 381/80 |
| 2014/0180730 A1* | 6/2014 | Cordova | ................ | G07C 5/085 |
| | | | | 705/4 |
| 2014/0306799 A1* | 10/2014 | Ricci | ....................... | H04W 4/21 |
| | | | | 340/5.83 |
| 2015/0141043 A1* | 5/2015 | Abramson | ............. | G01C 21/34 |
| | | | | 455/456.1 |
| 2015/0168174 A1* | 6/2015 | Abramson | ......... | G01C 21/3697 |
| | | | | 701/408 |
| 2015/0312404 A1* | 10/2015 | Abramson | ............ | H04W 4/027 |
| | | | | 455/418 |
| 2016/0021238 A1* | 1/2016 | Abramson | ............ | H04W 48/04 |
| | | | | 455/418 |
| 2016/0205238 A1* | 7/2016 | Abramson | ......... | G01C 21/3484 |
| | | | | 455/456.4 |

OTHER PUBLICATIONS

"Support vector machine", Wikipedia, https://wikipedia.org/wiki/Support_vector_machine, Feb. 12, 2016, 19 pgs.

"Cosine similarity", Wikipedia, https://wikipedia.org/wiki/Cosine_similarity, Feb. 12, 2016. 5 pgs.

"Exponential smoothing", Wikipedia, https://wikipedia.org/wiki/Exponential smoothing, Feb. 12, 2016, 8 pgs.

"Sensor fusion", Wikipedia, https://wikipedia.org/wiki/Sensor fusion, Feb. 12, 2016, 5 pgs.

"You're Driving and Texting: Detecting Drivers Using Personal Smart Phones by Leverating Inertial Sensors", Cheng Bo, et al., MobiCom '13. Sep. 30-Oct. 4, 2013, 3 pgs.

"Sensing Vehicle Dynamics for Determining Driver Phone Use", Yan Wang, et al. MobiSys '13, Jun. 25-28, Taipei, Taiwan, 14 pgs.

"I am a Smartphone and I Know My User is Driving"; Hon Chu, et al., Duke University, Hon Chu et al.—5 Pages.

ISA/KR, "International Search Report," Application No. PCT/KR2016/009940, Dec. 23, 2016, Korean Intellectual Property Office, Daejeon, Korea, 15 pages.

* cited by examiner

IDENTIFYING AND LOCALIZING A VEHICLE OCCUPANT BY CORRELATING HAND GESTURE AND SEATBELT MOTION

TECHNICAL FIELD

This disclosure relates generally to vehicle personalization systems. More specifically, this disclosure relates to identifying and localizing a vehicle occupant by correlating hand gesture and seatbelt motion.

BACKGROUND

The connected car, with increasing annual revenue, has attracted strong research and development interest from automakers, mobile carriers, and consumer electronics manufactures. Among the research and development focuses, a key challenge is to enable personalized services such as information and entertainment (infotainment) for each occupant, including both the driver and passengers. Wearable devices, such as Samsung Gear series smartwatches, have become increasingly popular. These wearable devices can provide activity tracking and other functions comparable to those provided by a smart phone.

Mobile carriers have recently launched applications and services to restrict phone use while driving. Specifically, if a phone is detected to be inside a moving car, it will limit functionalities to avoid possible distractions, regardless whether it is with the driver or passengers. This is inconvenient for passengers, who will usually end up disabling this service all together.

SUMMARY

Embodiments of the present disclosure provide for identifying and localizing a vehicle occupant by correlating hand gesture and seatbelt motion.

In one embodiment, a system for locating an occupant within a vehicle is provided. The system includes a communication interface and at least one processor. The communication interface is configured to receive motion data of a seatbelt for a seat in the vehicle and receive motion data of a wearable device of the occupant. The at least one processor is configured to compare the seatbelt motion data with the wearable device motion data from a same period of time and identify that the occupant is located at the seat in the vehicle based on a result of the comparison.

In another embodiment, a vehicle for locating an occupant is provided. The vehicle includes one or more seats; one or more seatbelts for the one or more seats; a communication interface, and at least one processor. The communication interface is configured to receive motion data of one of the seatbelts, send the seatbelt motion data to a server for comparison with motion data of a wearable device of the occupant of the vehicle from a same period of time, and receive information indicating that the occupant is located at a seat of the one seatbelt. The at least one processor is configured to identify personalization options for the occupant at the seat based on a user profile of the occupant in response to identification that the occupant is located at the seat.

In yet another embodiment, a method for locating an occupant within a vehicle is provided. The method includes receiving motion data of a seatbelt for a seat in the vehicle and receiving motion data of a wearable device of the occupant. The method also includes comparing the seatbelt motion data with the wearable device motion data from a same period of time and identifying that the occupant is located at the seat in the vehicle based on a result of the comparison.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure recognize that a major challenge in connected car solutions is how to enable personalization automatically. For example, the driver can have her favorite music channel and seat position set up without her taking additional actions. Moreover, if the vehicle has an entertainment system for backseat passages (e.g., display, audio), further personalization is useful. To enable complete personalization for each seat, the vehicle needs to know the identity of the occupant in each seat. Accordingly, embodiments of the present disclosure provide for identification of the occupant in each seat automatically or without the occupant needing to enter identifying information herself. Various embodiments of the present disclosure provide support for occupant personalization without require occupant's intervention for identification. Some detailed examples are provided below.

Embodiments of the present disclosure recognize that progress in driver identification has occurred. Some cars identify the driver based on the key inserted. However, embodiments of the present disclosure recognize that this method is not applicable if the key is shared by multiple drivers, (e.g., in the case of rental cars). Some other cars identify the driver by asking for an identifier (e.g., a PIN). Embodiments of the present disclosure recognize that this method is inconvenient as it relies on driver's interaction.

Embodiments of the present disclosure also recognize that other options for identifying an occupant in each seat of a vehicle involve request occupants to take addition actions. In particular, an occupant can identify herself through bar-code labels, RFID tags, or biometric collection devices (e.g., camera, fingerprint reader, etc.) at her seat. Embodiments of the present disclosure recognize that these options may be undesirable requiring intervention from each occupant. Moreover, privacy issues become prevalent when biometrics are used for identification.

Accordingly, embodiments of the present disclosure provide convenience by using wearable devices provide personalization in connected car. Embodiments of the present disclosure address the aforementioned issues by making the vehicle aware of the identity of occupant in each seat without requiring the occupant's intervention.

Figure 1:
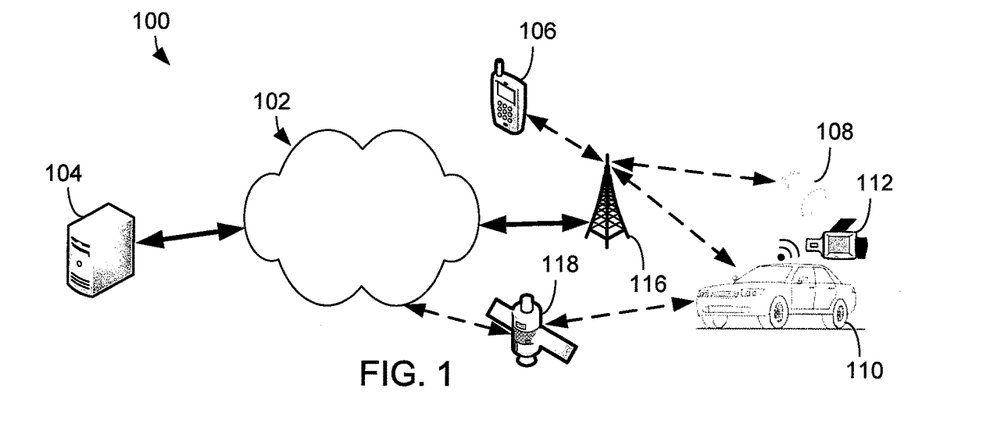
FIG. 1 illustrates an example communication system in which various embodiments of the present disclosure may be implemented.

FIG. 1 illustrates an example communication system 100 in which various embodiments of the present disclosure may be implemented. The embodiment of the communication system 100 shown in FIG. 1 is for illustration only. Other embodiments of the communication system 100 could be used without departing from the scope of this disclosure.

As shown in FIG. 1, the system 100 includes a network 102, which facilitates communication between various components in the system 100. For example, the network 102 may communicate Internet Protocol (IP) packets, frame relay frames, or other information between network addresses. The network 102 may include one or more local area networks (LANs); metropolitan area networks (MANs); wide area networks (WANs); all or a portion of a global network, such as the Internet; or any other communication system or systems at one or more locations.

The network 102 facilitates communications between at least one server 104 and various client devices 106-110. Each server 104 includes any suitable computing or processing device that can provide computing services for one or more client devices. Each server 104 could, for example, include one or more processing devices, one or more memories storing instructions and data, and one or more network interfaces facilitating communication over the network 102.

Each client device 106-110 represents any suitable computing or communication device with a display that interacts with at least one server or other computing device(s) over the network 102. In this example, the client devices 106-114 include electronic devices, such as, for example, mobile telephone(s) or smartphone(s) 106, wearable device(s) 108, vehicle(s) 110, a laptop computer, a tablet computer, etc. However, any other or additional client devices could be used in the communication system 100.

In this example, some client devices 106-110 communicate indirectly with the network 102. For example, the client devices 106-110 communicate via one or more base stations 116, such as cellular base stations or eNodeBs. Also, the client devices 106-110 may communicate via one or more wireless access points (APs), such as IEEE 802.11 wireless APs. Note that these are for illustration only and that each client device could communicate directly with the network 102 or indirectly with the network 102 via any suitable intermediate device(s) or network(s). For example, the vehicle 110 may communicate with the network 102 via one or more satellites 118 for receiving and/or sending entertainment and location (e.g., GPS) information.

In this illustrative example, vehicle 110 is a connected vehicle capable of providing information and entertainment to occupants. As described in more detail below, the vehicle 110 provides personalization options for the occupants based on a user profile as a result of locating the occupants within seats of the vehicle 110. The vehicle 110 also communicates with devices (e.g., wearable devices 108 and enhanced seatbelt buckles) located within the vehicle 110. For example, the vehicle 110 may communicate via a personal area network (PAN), such as Bluetooth, or near field communication (NFC) to send and receive information to and from devices located within the vicinity of vehicle 110. While illustrated as a car, vehicle 110 may be any suitable vehicle capable of communication and for which personalization options can be provided for occupants, such as, for example, without limitation, a bus, a train, a plane, etc.

As described in more detail below, the server 104 may represent as server of a cloud computing system that provides for the identification and localization of a vehicle occupant by correlating hand gesture and seatbelt motion. For example, the server 104 may receive motion patterns from a wearable device 108 of an occupant of the vehicle 110 as well as from an enhanced seatbelt buckle 112 (e.g., the connected vehicle 110).

Although FIG. 1 illustrates one example of a communication system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
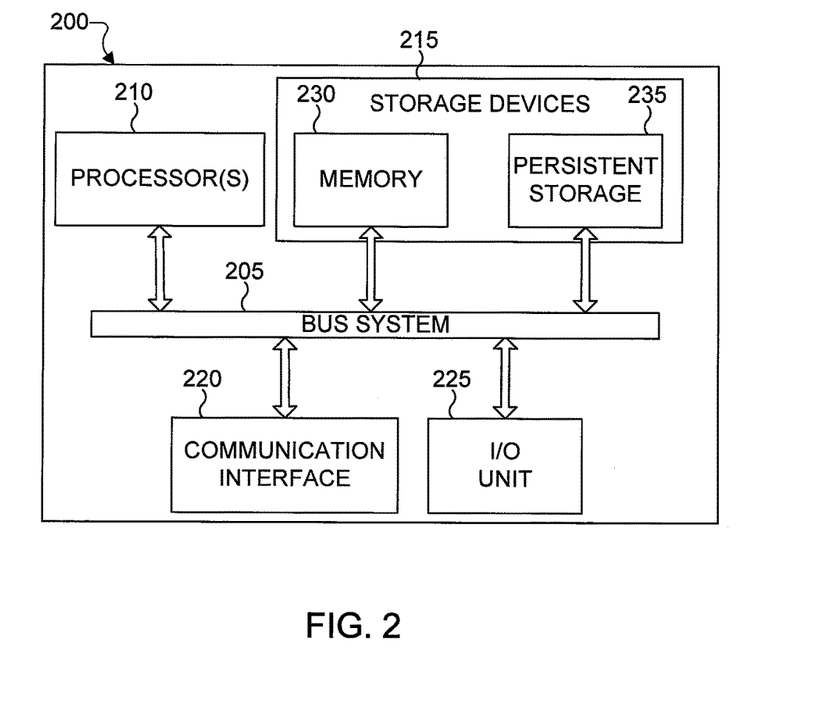
FIG. 2 illustrates an example computer system according to various embodiments of the present disclosure.
Figure 3:
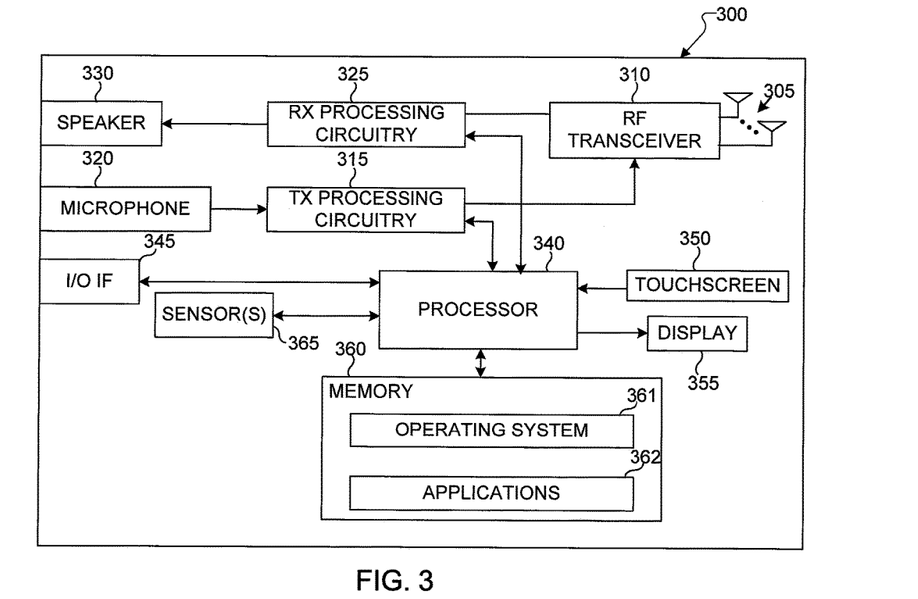
FIG. 3 illustrates an example electronic device according to various embodiments of the present disclosure.

FIGS. 2 and 3 illustrate example electronic devices in a communication system according to various embodiments of the present disclosure. In particular, FIG. 2 illustrates an example computer system 200, and FIG. 3 illustrates an example electronic device 300. In this illustrative example, the computer system 200 represents the server 104 in FIG. 1, and the electronic device 300 could represent one or more of the client devices 106-108 in FIG. 1.

As shown in FIG. 2, the computer system 200 includes a bus system 205, which supports communication between at least one processor 210, at least one storage device 215, at least one communications interface 220, and at least one input/output (I/O) unit 225.

The processor 210 executes instructions that may be loaded into a memory 230. The processor 210 may include any suitable number(s) and type(s) of processors or other devices in any suitable arrangement. Example types of processor 210 include microprocessors, microcontrollers, digital signal processors, field programmable gate arrays, application specific integrated circuits, and discreet circuitry. The processor 210 may be a general-purpose CPU or specific purpose processor for encoding or decoding of video data.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a read-only memory, hard drive, Flash memory, or optical disc.

The communications interface 220 supports communications with other systems or devices. For example, the communications interface 220 could include a network interface card or a wireless transceiver (e.g., satellite, cellular, WiFi, Bluetooth, NFC, etc.) facilitating communications over the network 102. The communications interface 220 may support communications through any suitable physical or wireless communication link(s). The communications interface 220 may include only one or both of a transmitter and receiver, for example, only a receiver may be included in a decoder or only a transmitter may be included in an encoder.

The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device.

As described in more detail below, the computer system 200 may be a server of a cloud computing system that provides for the identification and localization of a vehicle occupant by correlating hand gesture and seatbelt motion. The computer system 200 may also be located in a vehicle (e.g., such as vehicle 110) for locating an occupant and/or providing personalization options for occupants located in the vehicle.

FIG. 3 illustrates an example electronic device 300 according to various embodiments of the present disclosure. In this embodiment, the electronic device 300 is an example of one or more of the client devices (e.g., such as client devices 106-108 of FIG. 1). The embodiment of the electronic device 300 illustrated in FIG. 3 is for illustration only, and the client devices 106-108 of FIG. 1 could have the same or similar configuration. However, electronic devices come in a wide variety of configurations, and FIG. 3 does not limit the scope of this disclosure to any particular implementation of an electronic device.

As shown in FIG. 3, the electronic device 300 includes antenna(s) 305, a transceiver 310, transmit (TX) processing circuitry 315, a microphone 320, and receive (RX) processing circuitry 325. The electronic device 300 also includes a speaker 330, a processor 340, an input/output (I/O) interface (IF) 345, a touchscreen 350, a display 355, a memory 360, and one or more sensors 365. The memory 360 includes an operating system (OS) 361 and one or more applications 362.

The transceiver 310 receives, from the antenna(s) 305, an incoming RF signal transmitted by an access point (e.g., base station, WiFi router, Bluetooth device) for a network (e.g., a WiFi, Bluetooth, cellular, 5G, LTE, LTE-A, WiMAX, or any other type of wireless network). The transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The transceiver 310 receives the outgoing processed baseband or IF signal from the TX processing circuitry 315 and up-converts the baseband or IF signal to an RF signal that is transmitted via the antenna(s) 305. In some embodiments, the transceiver 310, the TX processing circuitry 315, and the RX processing circuitry 325 may be implemented within the same block or chip, such as a WiFi and/or Bluetooth module and/or chip.

The processor 340 can include one or more processors or other processing devices and execute the OS 361 stored in the memory 360 in order to control the overall operation of the electronic device 300. For example, the processor 340 could control the reception of forward channel signals and the transmission of reverse channel signals by the transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the electronic device 300 with the ability to connect to other devices, such as laptop computers and handheld computers. The I/O interface 345 is the communication path between these accessories and the processor 340.

The processor 340 is also coupled to the touchscreen 350 and the display 355. The operator of the electronic device 300 can use the touchscreen 350 to enter data and/inputs into the electronic device 300. The display 355 may be a liquid crystal display, light-emitting diode (LED) display, optical LED (OLED), active matrix OLED (AMOLED), or other display capable of rendering text and/or at graphics, such as from web sites, videos, games, etc. The touchscreen 350 can include a touch panel, a (digital) pen sensor, a key, or an ultrasonic input device.

The memory 360 is coupled to the processor 340. Part of the memory 360 could include a random access memory (RAM), and another part of the memory 360 could include a Flash memory or other read-only memory (ROM).

Electronic device 300 further includes one or more sensors 365 that can meter a physical quantity or detect an activation state of the electronic device 300, and convert metered or detected information into an electrical signal. For example, sensor 365 may include one or more buttons for touch input, a camera, a gesture sensor, a gyroscope or gyro sensor, an air pressure sensor, a magnetic field sensor or magnetometer, an acceleration sensor or accelerometer, a grip sensor, a proximity sensor, a color sensor (e.g., a Red Green Blue (RGB) sensor), a temperature/humidity sensor, an illumination sensor, etc. The sensor(s) 365 can further include a control circuit for controlling at least one of the sensors included therein. As will be discussed in greater detail below, one or more of these sensor(s) 365 may be one or more of an accelerometer, a gyroscope, and a magnetic field sensor to generate a motion pattern for an occupant buckling her seatbelt.

Although FIG. 3 illustrates one example of an electronic device 300, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In one or more embodiments, the speaker 330, the microphone 320, and or the touchscreen 350 may not be included in the device 300. For example, in some embodiments, the electronic device 300 may be a smartwatch having display/user interface functionality comparable with that of a smartphone or may be a simple activity tracker with wireless communication functionality but limited or no display/user interface functionality.

Embodiments of the present disclosure recognize and take into account that each occupant of a vehicle 110 makes a unique gesture to buckle her seatbelt, which includes raising her hand to grab the seatbelt, pulling the seatbelt around her waist, inserting the buckle into the latch, and finally moving the hand away after the click. This entire gesture can be captured by occupant's wearable device 108 (e.g., a smartwatch or activity tracker) on her hand. Based on the assumption that the seatbelt sensors in the enhanced seatbelt buckle 112 (as discussed below) can simultaneously capture the corresponding movement during this gesture, embodiments of the present disclosure correlate these two movement patterns to uniquely identify the occupant of each seat, thus supporting personalization for all occupants.

Components of various embodiments of the present disclosure include an enhanced seatbelt buckle 112 to capture the seatbelt's movement during the seatbelt buckling gesture; a wearable device 108 worn by an occupant to capture her hand movement during the seatbelt buckling gesture; an occupant identification method to associate the occupant's identity through her wearable device and the seat she occupies based on correlating the above two movement patterns; a connected vehicle for identifying locations of occupants within the vehicle and providing personalization options based on occupant locations; and a cloud based platform to support personalization for each occupant.

Figure 4:
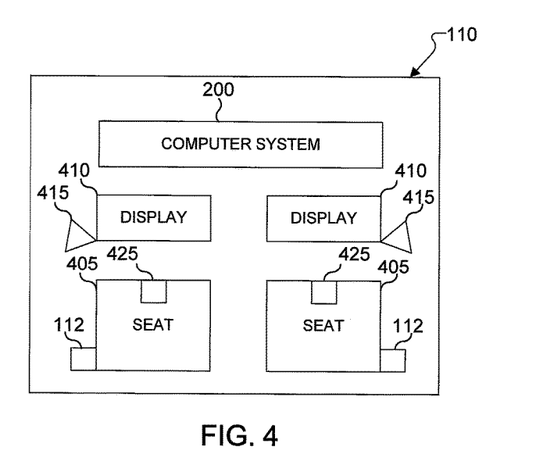
FIG. 4 illustrates a block diagram of an example vehicle for providing personalization services for located occupants according to one embodiment of this disclosure.

FIG. 4 illustrates a block diagram of an example vehicle 110 for providing personalization services for located occupants according to one embodiment of this disclosure. In this embodiment, the vehicle 110 of FIG. 1 is illustrated with example components. The embodiment of the vehicle 110 illustrated in FIG. 4 is for illustration only. FIG. 4 does not limit the scope of this disclosure to any particular implementation of an electronic device.

As illustrated, the vehicle 110 includes a computer system 200, various seats 405 for occupants (e.g., a driver and/or passengers), and personalization components 410 and 415. The personalization components 410 and 415 are components of the vehicle that can provide personalized services to occupants of the vehicle. Personalized services include media content such as infotainment that is specific to the occupant. For example, the display 410 may display a home screen of applications or content from an occupant's mobile device or preset infotainment based on the occupant's profile. The illustrated example includes displays 410 and speakers 415; however, any type of personalization components may be used. For example, each seat 405 may have a separate display 410 and speaker(s) 415 or the display 410 and speaker(s) 415 may be common for multiple seats 405. The display 410 may be a display in a dashboard, a console, or the back of another seat. In another example, the speaker 415 may be a headphones or audio jack for providing audio to the seat occupant.

The computer system 200 provides for communication and control of components within the vehicle 110. For example, the computer system 200 may query and receive motion data from enhanced seatbelt buckles 112 and may identify that the seats 405 are occupied based on an output from the seat sensor(s) 425. The computer system 200 can communicate this information to a cloud connected server 104 and receive information about locations of occupants within the vehicle and occupant profile data for personalization. The computer system 200 can also communicate with user devices, such as, mobile phones 106 and wearable devices 108 and control the output of infotainment via displays 410 and speakers 415. In some embodiments, the computer system 200 may make a comparison of motion data for the enhanced seatbelt buckles 425 and the user wearable devices 108 to determine the locations of occupants within the vehicle and occupant profile data for personalization.

Figure 5:
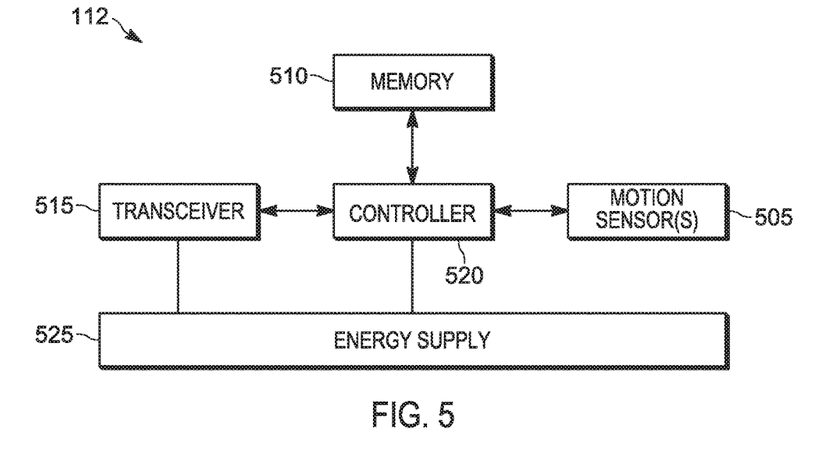
FIG. 5 illustrates a block diagram of an example enhanced seatbelt buckle according to various embodiments of the present disclosure.

FIG. 5 illustrates a block diagram of an example enhanced seat belt buckle 112 according to various embodiments of the present disclosure. The embodiment of the enhanced seat belt buckle 112 shown in FIG. 5 is for illustration only. Other embodiments of the enhanced seat belt buckle 112 could be used without departing from the scope of this disclosure.

The enhanced seatbelt buckle 112 is an important component of various embodiments of the present disclosure. The enhanced seatbelt buckle 112 captures the seatbelt buckling gesture on the vehicle side. The enhanced seatbelt buckle 112 includes one or more motion sensor(s) 505 to capture the movement of buckle 112 during the seatbelt buckling gesture. The motion sensor(s) 505 may include, but are not limited to, motion sensors such as accelerometer and gyroscope. For example, the motion sensor(s) 505 may include a gesture sensor, a gyroscope or gyro sensor, a magnetic field sensor or magnetometer, an acceleration sensor or accelerometer, etc. The memory 510 stores the captured motion pattern. Transceiver 515 communicates motion pattern data to with the car. One or more of various wireless communication protocols can be used, such as Wi-Fi, Bluetooth, ZigBee, and Z-Wave, for example. Controller 520 provides control to coordinate and bridge different components of the buckle 112. Specifically, controller 520 processes the measurements of motion sensor(s) 505, stores measurements in the memory 510, and transmits them to the vehicle via the transceiver 515. The energy supply 525 supplies power the above discussed components. For example, the energy supply 525 may be a battery, a wire to energy supply of the vehicle 110 via the seatbelt or the latch, and/or may use induction charging, for example, when buckled or when in an unbuckled position.

Figure 6:
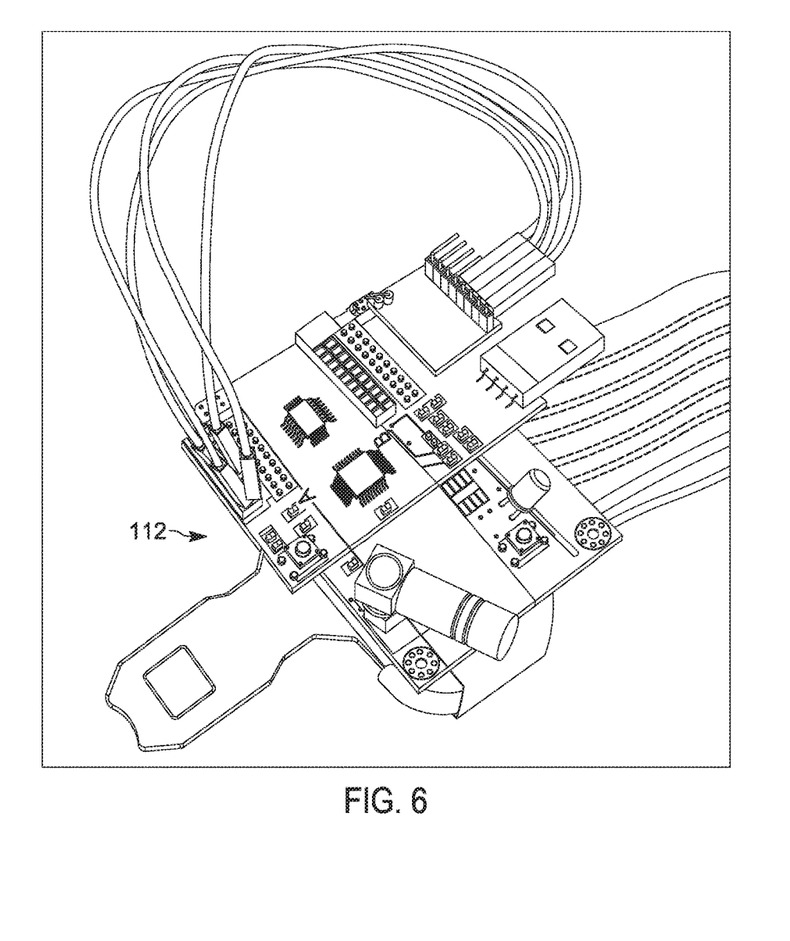
FIG. 6 illustrates an example enhanced seatbelt buckle according to one embodiment of the present disclosure.

In practice, the enhanced seatbelt buckle 112 may be either a replacement for existing seatbelt buckles (i.e., integrated within the seatbelt buckle) or an accessory that can be attached to existing seatbelt buckles. FIG. 6 illustrates an example enhanced seat belt buckle 112 according to one embodiment of the present disclosure. The embodiment of the enhanced seat belt buckle 112 shown in FIG. 6 is for illustration only. Other embodiments of the enhanced seat belt buckle 112 could be used without departing from the scope of this disclosure. In this example, the enhanced seat belt buckle 112 implemented with TI MSP430 controller, 10 KB RAM memory, a CC2420 radio, a MPU-6050 sensor, and powered by two AA batteries.

Embodiments of the present disclosure extract robust motion features to characterize the seatbelt buckling gesture. One challenge is that motion sensors on mobile/wearable devices typically use the coordinate system of the device. Thus, measurements of the device measurements are dependent on the device orientation and may not be able to be used directly. To address this issue, embodiments of the present disclosure map the device coordinate system to the a coordinate system of the environment by computing a device rotation matrix, and then extracting motion features based on the coordinate system of the environment. Alternatively, in practice, the motion features can be significantly simplified as the scalar magnitudes of acceleration during a period of measurement, thus the orientations of either seatbelt buckle or wearable become irrelevant.

Figure 7:
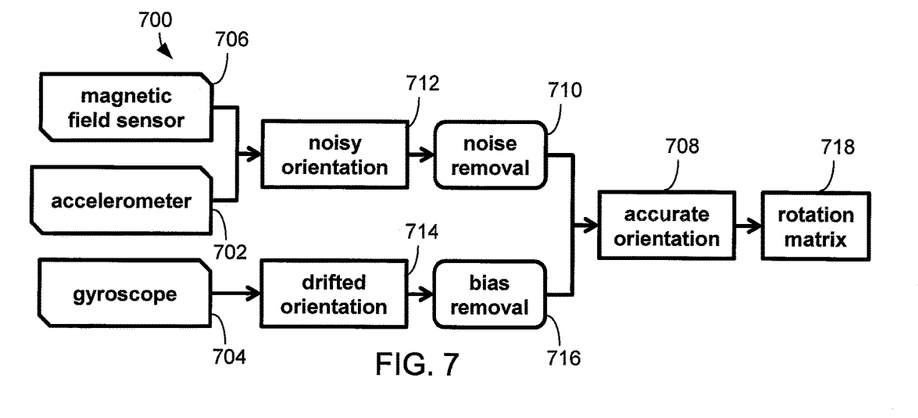
FIG. 7 illustrates an example sensor fusion pipeline process for obtaining a device rotation matrix according to one embodiment of the present disclosure.

FIG. 7 illustrates an example sensor fusion pipeline process 700 for obtaining a device rotation matrix according to one embodiment of the present disclosure. The process 700 may be performed by any component that processes the sensed motion data of the wearable device 108. For example, the server 104, the wearable device 108, and/or the computer system 200, collectively referred to here as "the system." The embodiment of the sensor fusion pipeline process 700 shown in FIG. 7 is for illustration only. Other embodiments of the sensor fusion pipeline process 700 could be used without departing from the scope of this disclosure.

In this illustrative example, the system computes device rotation matrix based on sensor fusion. The system fuses the measurements of accelerometer 702, gyroscope 704, and magnetic field sensor 706 to get the accurate device orientation 708. For example, the system performs noise removal 710 to remove noise from the noisy orientation 712 of the accelerometer 702 and magnetic field sensor 706 outputs. The system also accounts for drifted orientation 714 of the gyroscope 704 using bias removal 716. By comparing device orientation readings over time, embodiments of the present disclosure obtain device rotation matrix 718. In one example, the noise and bias removal 710 and 716 are implemented using low-pass and high-pass filters, respectively.

Figure 8:
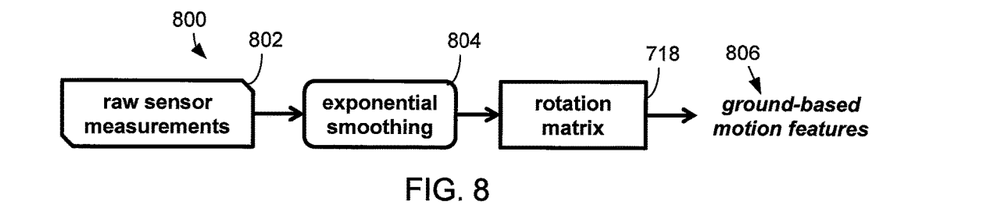
FIG. 8 illustrates an example process for extract ground-based motion features according to one embodiment of the present disclosure.

FIG. 8 illustrates an example process 800 for extract ground-based motion features according to one embodiment of the present disclosure. The process 800 may be performed by any component that processes the sensed motion data of the wearable device 108. For example, the server 104, the wearable device 108, and/or the computer system 200, collectively referred to here as "the system." The embodiment of the process 800 shown in FIG. 8 is for illustration only. Other embodiments of the process 800 could be used without departing from the scope of this disclosure.

FIG. 8 illustrates extraction of robust motion features. The system converts raw sensor measurements 802 from the device coordinate system to the coordinate system of the environment using the rotation matrix 718, thus extracting ground-based motion features 806. In addition, the system applies exponential smoothing to remove the bias and random noise in the raw sensor measurements 802.

Figure 9:
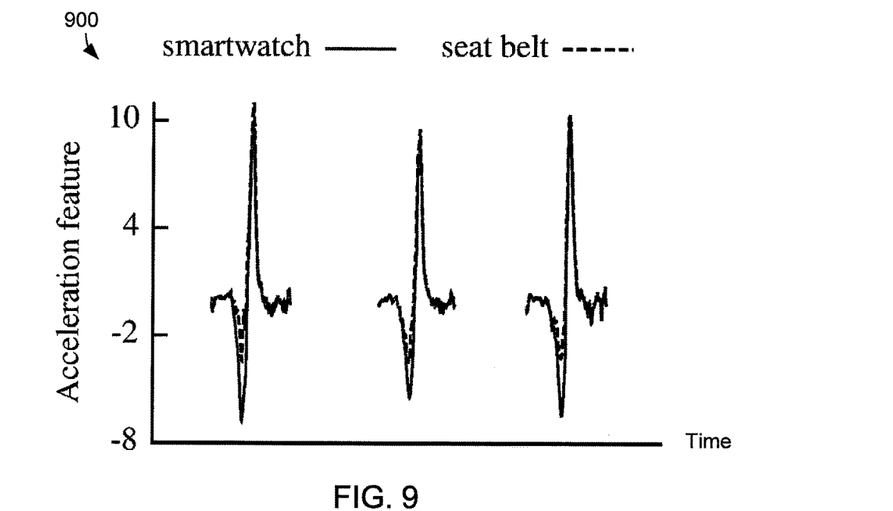
FIG. 9 illustrates a graph including a comparison of example ground-based acceleration features.

FIG. 9 illustrates an example graph 900 including a comparison of example ground-based acceleration features. The example graph 900 shown in FIG. 9 is for illustration only. Other example graphs 900 could be used without departing from the scope of this disclosure.

In this illustrative example, the ground-based acceleration features extracted from three buckling gestures for the enhanced seatbelt buckle 112 and wearable device 108 are compared during the same period of time. The buckling gesture maintains stable acceleration features along the three directions in the coordinate system of the environment. Note that such ground-based motion features do not depend on how the device is carried.

Embodiments of the present disclosure identify an occupant by correlating the movement patterns captured by the enhanced seatbelt buckle 112 and wearable device 108 during the same period of time. In some embodiments, various metrics such as cosine similarity or other threshold correlation values may be adopted to quantify the correlation. Two movement patterns are considered as correlated if the movement patterns captured by the enhanced seatbelt buckle 112 and wearable device 108 have matching timestamps and their similarity score is higher than a certain threshold. FIG. 9 illustrates the acceleration features simultaneously captured the enhanced seatbelt buckle 112 and wearable device 108 during three buckling gestures. As illustrated, the two movement patterns are well correlated.

Figure 10:
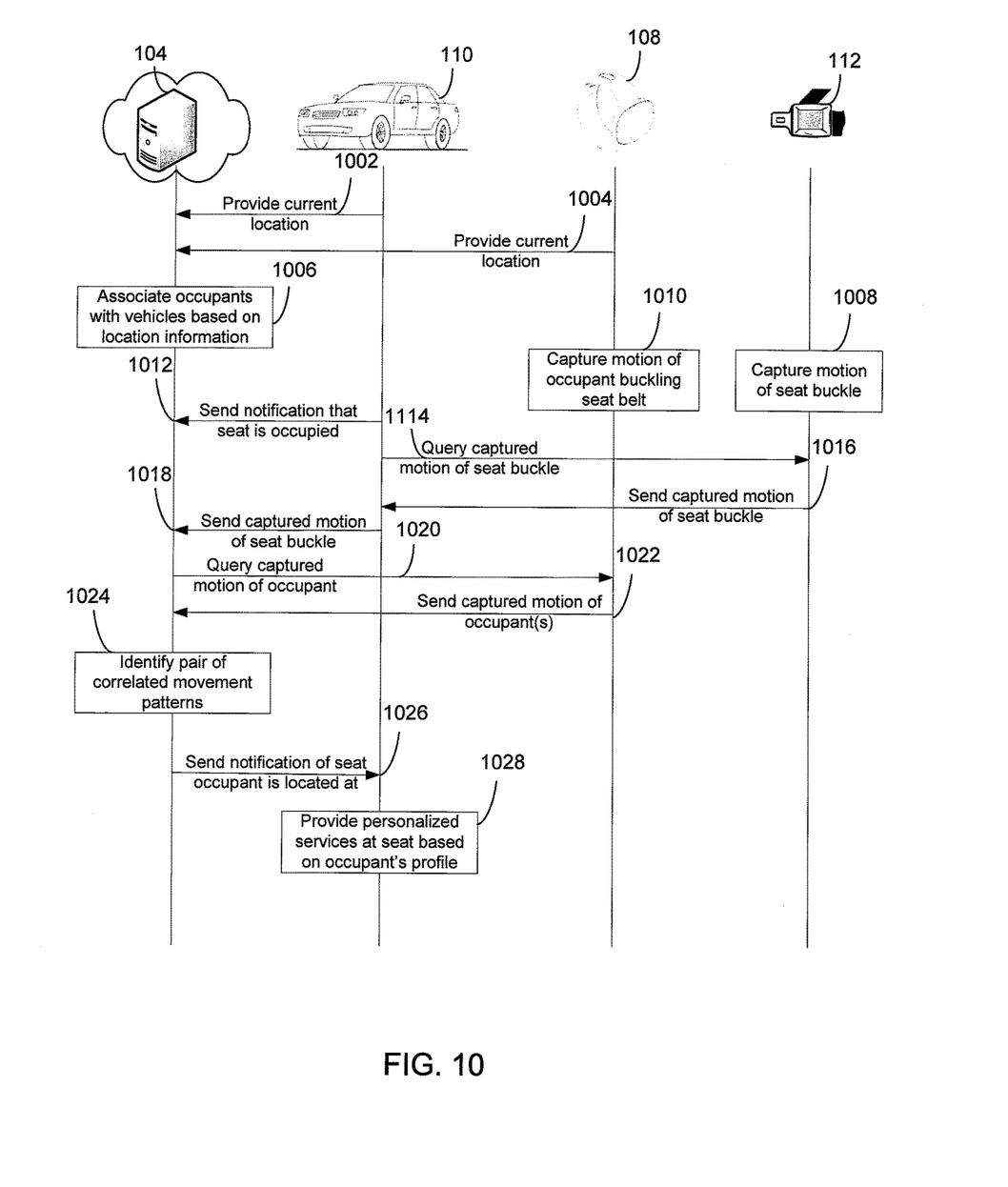
FIG. 10 illustrates a flowchart of an example process for occupant identification and personalization according to one embodiment of the present disclosure.

FIG. 10 illustrates a flowchart of an example process 1000 for occupant identification and personalization according to one embodiment of the present disclosure. In this embodiment, the parts of process depicted in FIG. 10 are performed by various components in the communication system 100, including the cloud connected server 104; the wearable device 108, the vehicle 110, and the enhanced seatbelt buckle 112. The embodiment of the process 1000 shown in FIG. 10 is for illustration only. Other embodiments of the process 1000 could be used without departing from the scope of this disclosure.

The process begins with the occupants (e.g., via the wearable device 108 or the user's mobile phone) and the vehicle 110 providing their current locations (steps 1002 and 1004), respectively, to the cloud server 104. The server 104 associates a group of occupants to a vehicle based on the occupants and vehicle location information (step 1006).

When occupant (e.g., the driver or a passenger) enters the vehicle 110 and sits in a seat with the enhanced seatbelt buckle 112, the occupant will buckle her seatbelt. During this gesture, the sensors of enhanced seatbelt buckle 112 capture the movement of buckle (step 1008) as a feature-time sequence, e.g., denoted by $[(p_0^{CS}, t_0), (p_1^{CS}, t_1), \ldots, (p_{N-1}^{CS}, t_{N-1})]$, in which feature $p_i^{CS}$ is ground-based and may include the moving speed, acceleration, timing, and/or any other motion features of seatbelt buckle at time $t_i$. The seat belt buckling gesture is made by the occupant's hand wearing the wearable device 108. Simultaneously during this gesture, the motion sensors on wearable device 108 capture the movement of the occupant's hand (step 1010) as a feature-time sequence, e.g., denoted by $[(P_0^R, T_0), (P_1^R, T_1), \ldots, (P_{N-1}^R, T_{N-1})]$, in which feature $P_i^R$ is ground-based and may include the moving speed, acceleration, timing, and/or any other motion features of the occupant's hand at time $T_i$.

In some embodiments, a set of machine learning algorithms, such as support vector machine (SVM) and random forest (RF), are used to distinguish the seatbelt buckling gesture from other gestures. Therefore, in various embodiments, the features captured by the wearable device 108 may only characterize occupant's hand movement during the buckling gesture.

When the seat is occupied, the vehicle 110 identifies that the seat is occupied, for example, via an output from a seat sensor and sends a notification to the server 104 that the seat is occupied (step 1012). Upon detecting the seatbelt is buckled, the vehicle 110 queries for the captured movement (step 1014). The enhanced seatbelt buckle 112 sends the captured movement to the vehicle 110 (step 1016). Then, the vehicle 110 uploads the motion data (e.g., the movement pattern) to the cloud server 104 (step 1018).

Meanwhile, as a result of the vehicle 110 notifying the server 104 that the seat is occupied, the cloud then queries the wearable device 108 of each associated occupant for the captured motion data (step 1020). Each wearable device 108 uploads the recently captured movement of buckling gesture, if available, to the server 104 (step 1022).

The cloud server 104 compares the movement pattern from each wearable device 108 associated with the vehicle 110 to with that from the seat buckle 112 to identify a pair of correlated movement patterns. Based on the correlated movement patterns, the server determines that a particular occupant R sits in a particular seat S of the vehicle 110.

The cloud server 104 notifies the vehicle 110 that occupant R is in seat S and then pushes (e.g., sends identification information) of occupant R's profile to the vehicle 110 (step 1026). As a result of being formed of the identity and location of the occupant R in the vehicle, the vehicle 110 provides personalized services at S based on the occupant R's profile.

These illustrative embodiments do not require the occupant's intervention (e.g., input PIN and scan barcode) to identify occupant in each seat. Rather, in these embodiments, the vehicle is enabled to automatically load the occupant's personalized services before the vehicle starts to move.

Figure 11:
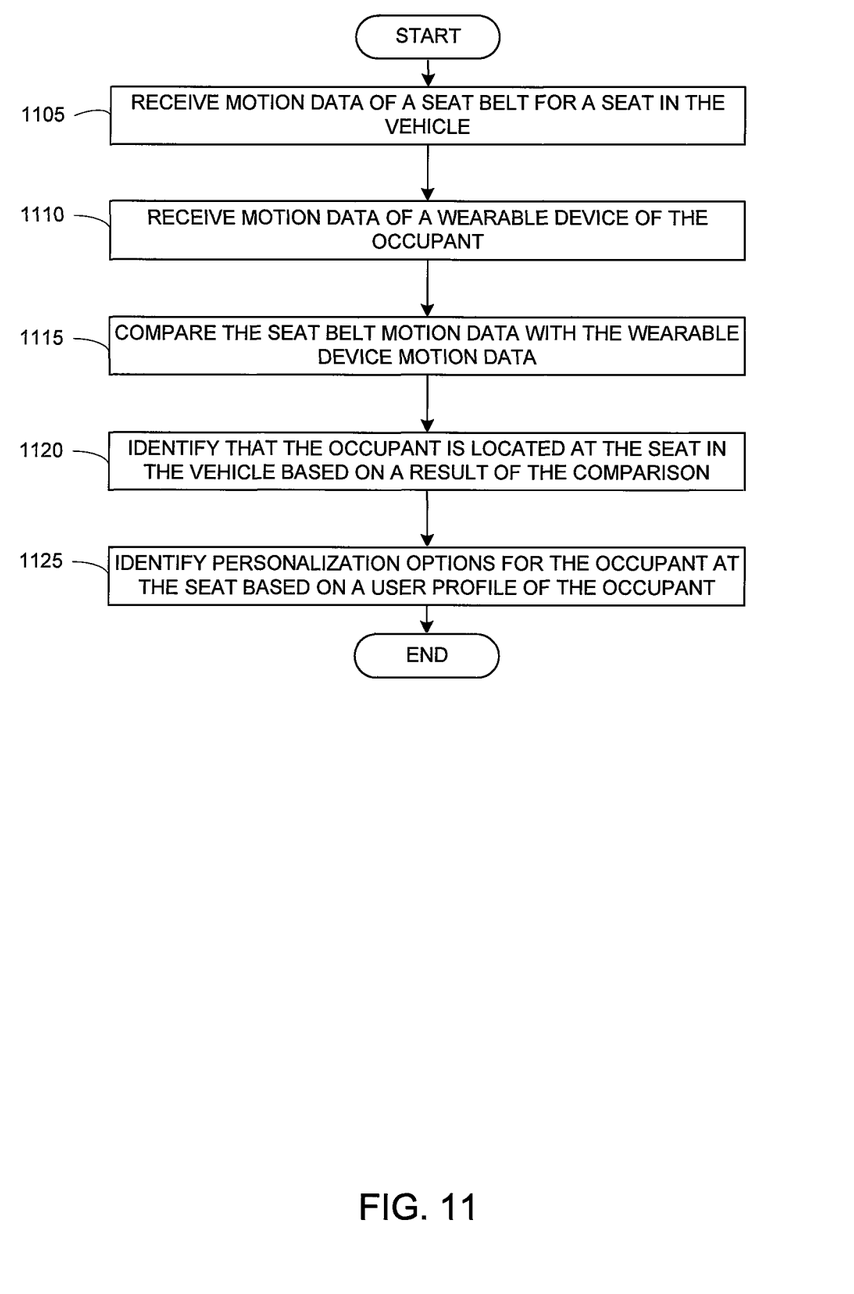
FIG. 11 illustrates a flowchart for a process for locating an occupant within a vehicle according to various embodiments of this disclosure.

FIG. 11 illustrates a process 1100 for locating an occupant within a vehicle in accordance with various embodiments of the present disclosure. For example, the process depicted in FIG. 11 may be performed by the server 104 in FIG. 1. The process may also be implemented by the vehicle 110 in FIG. 1. The embodiment of the process 1100 shown in FIG. 11 is for illustration only. Other embodiments of the process 1100 could be used without departing from the scope of this disclosure.

The process begins with the system receiving motion data of a seat belt for a seat in the vehicle (step 1105). For example, in step 1105, the system may receive the seat belt motion data from the enhanced seat buckle 112 via the vehicle 110. The system then receives motion data of a wearable device of the occupant (step 1110). For example, in step 1110, the system may receive, from the vehicle 110, a notification that the seat in the vehicle is occupied and then request or identify received wearable device motion data for any occupant associated with the vehicle in response to receipt of the notification. The system may associate the occupant with the vehicle 110 based on earlier received location information of the vehicle and location information of the wearable device of the occupant.

The system compares the seat belt motion data with the wearable device motion data (step 1115). For example, in step 1115, the motion data may be processed to identify features of the motion from the respective devices for comparison. The system then identifies that the occupant is located at the seat in the vehicle based on a result of the comparison (step 1120). For example, in step 1120, the system may identify a pair of correlated wearable device and seat belt motion patterns from among a plurality of wearable device motion patterns and seat belt motion patterns for a plurality of occupants of the vehicle. The motion data may be acceleration data and the system may then compare an acceleration pattern of the seat belt with an acceleration pattern of the wearable device.

Thereafter, the system identifies personalization options for the occupant at the seat based on a user profile of the occupant (step 1125). For example, in step 1125, the system may provide user profile information to the vehicle or the vehicle may load profile information from a connected user device. Based on identifying that the occupant is located at the seat and the user's profile information, the system may load and provide personalized infotainment to the user in the vehicle (e.g., play audio or video, load applications, modify seat settings, etc.).

Although FIGS. 10 and 11 illustrate examples of processes for occupant identification and personalization and locating an occupant within a vehicle, respectively, various changes could be made to FIGS. 10 and 11. For example, while shown as a series of steps, various steps in each figure could overlap, occur in parallel, occur in a different order, or occur multiple times.

Embodiments of the present disclosure provide an enhanced seatbelt buckle to capture the movement of buckle during occupant's seatbelt buckling gesture. Embodiments of the present disclosure characterize the seatbelt buckling gesture uses ground-based robust motion features. By monitoring and correlating the movement of occupant's hand and seatbelt buckle, embodiments of the present disclosure can identify occupant in each seat without occupant's intervention and thus enable her personalized services automatically. Embodiments of the present disclosure can be implemented in any other transportation systems that have seatbelts and ability to support personalization.

Embodiments of the present disclosure address a key problem in connected car solutions—how to provide each occupant personalized services automatically. By monitoring and correlating the movement of occupant's hand and seatbelt, embodiments of the present disclosure identify the occupant in each seat without occupant's intervention and then enables personalization based on occupant's profile stored in the cloud or user device.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A system for locating an occupant within a vehicle, the system comprising:
   a communication interface configured to:
      receive motion data generated by a seatbelt motion sensor operably connected to a seatbelt for a seat in the vehicle, and
      receive motion data of a wearable device of the occupant; and
   at least one processor configured to:
      compare the seatbelt motion data with the wearable device motion data from a same period of time, and
      identify that the occupant is located at the seat in the vehicle based on a result of the comparison.

2. The system of claim 1, wherein the at least one processor is configured to identify and configure personalization options for the occupant at the seat based on a user profile of the occupant in response to identification that the occupant is located at the seat.

3. The system of claim 1, wherein the at least one processor is configured to associate the occupant with the vehicle based on location information of the vehicle and location information of the wearable device of the occupant.

4. The system of claim 3, wherein:
   the communication interface is configured to receive, from the vehicle, a notification that the seat in the vehicle is occupied; and
   the at least one processor is configured to identify wearable device motion data for any occupant associated with the vehicle in response to receipt of the notification.

5. The system of claim 1, wherein the at least one processor is configured to identify a pair of correlated wearable device and seatbelt motion patterns from among a plurality of wearable device motion patterns and seatbelt motion patterns for a plurality of occupants of the vehicle.

6. The system of claim 1, wherein:
   the seatbelt motion data and the wearable device motion data comprise acceleration data; and
   the at least one processor is configured to compare an acceleration pattern of the seatbelt with an acceleration pattern of the wearable device.

7. The system of claim 1, wherein the system is located in one of the vehicle and a server for a cloud computing system.

8. A vehicle for locating an occupant, the vehicle comprising:
   one or more seats;
   one or more seatbelts for the one or more seats, respectively;
   one or more seatbelt motion sensors operably connected to the one or more seatbelts, respectively;
   a communication interface configured to:
      receive motion data generated by one of the seatbelt motion sensors for one of the seatbelts,
      send the seatbelt motion data to a server for comparison with motion data of a wearable device of the occupant of the vehicle from a same period of time, and
      receive information indicating that the occupant is located at a seat of the one seatbelt; and
   at least one processor configured to identify personalization options for the occupant at the seat based on a user profile of the occupant in response to identification that the occupant is located at the seat.

9. The vehicle of claim 8, wherein the communication interface is configured to send, to the server, location information for associating occupant with the vehicle based on location.

10. The vehicle of claim 8, further comprising: one or more seat sensors,
    wherein the at least one processor is configured to identify that the seat is occupied based on an output of the one or more seat sensors, and
    the communication interface is configured to send, to the server, a notification that the seat in the vehicle is occupied.

11. The vehicle of claim 8, wherein the one seatbelt comprises:
    a buckle including the one seatbelt motion sensor configured to sense a motion pattern of the one seatbelt to generate the seatbelt motion data, and
    a transceiver configured to transmit the seatbelt motion data to the communication interface.

12. The vehicle of claim 11, wherein the one or more motion sensors comprise at least one of an accelerometer, a gyroscope, and a magnetic field sensor.

13. The vehicle of claim 8, further comprising:
    at least one display and at least one speaker associated with the seat,
    wherein the processor configured to provide the personalization options for the occupant at the seat via the at least one display and the at least one speaker.

14. A method for locating an occupant within a vehicle, the method comprising:
    receiving motion data generated by a seatbelt motion sensor operably connected to a seatbelt for a seat in the vehicle;

receiving motion data of a wearable device of the occupant;

comparing the seatbelt motion data with the wearable device motion data from a same period of time; and identifying that the occupant is located at the seat in the vehicle based on a result of the comparison.

15. The method of claim 14, further comprising identifying personalization options for the occupant at the seat based on a user profile of the occupant in response to identifying that the occupant is located at the seat.

16. The method of claim 14, further comprising associating the occupant with the vehicle based on location information of the vehicle and location information of the wearable device of the occupant.

17. The method of claim 16, further comprising:

receiving, from the vehicle, a notification that the seat in the vehicle is occupied, wherein receiving the motion data of the wearable device of the occupant comprises identifying wearable device motion data for any occupant associated with the vehicle in response to receipt of the notification.

18. The method of claim 14, wherein identifying that the occupant is located at the seat in the vehicle comprises identifying a pair of correlated wearable device and seatbelt motion patterns from among a plurality of wearable device motion patterns and seatbelt motion patterns for a plurality of occupants of the vehicle.

19. The method of claim 14, wherein:

the seatbelt motion data and the wearable device motion data comprise acceleration data; and the comparison includes comparing an acceleration pattern of the seatbelt with an acceleration pattern of the wearable device.

20. The method of claim 14, wherein the method is performed by at least one of the vehicle and a server for a cloud computing system.

* * * * *